(12) United States Patent
Guy

(10) Patent No.: US 11,376,676 B2
(45) Date of Patent: Jul. 5, 2022

(54) ROTARY CUTTING HEAD HAVING CUTTING EDGES EXTENDING PAST KEY ACTUATING PORTION

(71) Applicant: Iscar, Ltd., Tefen (IL)

(72) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 202 days.

(21) Appl. No.: 16/922,617

(22) Filed: Jul. 7, 2020

(65) Prior Publication Data

US 2022/0009010 A1 Jan. 13, 2022

(51) Int. Cl.
| | |
|---|---|
| B23C 5/26 | (2006.01) |
| B23C 5/20 | (2006.01) |
| B23C 5/10 | (2006.01) |
| B23C 5/22 | (2006.01) |

(52) U.S. Cl.
CPC .............. B23C 5/109 (2013.01); B23C 5/22 (2013.01); B23C 5/20 (2013.01); B23C 5/26 (2013.01); B23C 2200/045 (2013.01); B23C 2210/02 (2013.01); B23C 2210/203 (2013.01); B23C 2210/40 (2013.01); B23C 2240/32 (2013.01)

(58) Field of Classification Search
CPC .......... B23C 2200/045; B23C 2210/02; B23C 2210/03; B23C 2210/086; B23C 2210/203; B23C 2210/40; B23C 2210/54; B23C 2240/32; B23C 5/10; B23C 5/109; B23C 5/22; B23B 31/1122; B23B 31/1107; B23B 31/11; B23B 31/1115
See application file for complete search history.

(56) References Cited

U.S. PATENT DOCUMENTS

| | | | |
|---|---|---|---|
| 6,485,220 B2 | 11/2002 | Hecht | |
| 7,374,376 B2 | 5/2008 | Jonsson et al. | |
| 7,611,311 B2 | 11/2009 | Kakai et al. | |
| 7,713,004 B2 | 5/2010 | Lehto et al. | |
| 8,226,333 B2 | 7/2012 | Kakai et al. | |
| 8,931,983 B2 | 1/2015 | Sharivker et al. | |
| 8,939,685 B2 | 1/2015 | Cigni | |
| 9,643,262 B2 | 5/2017 | Frota De Souza et al. | |
| 9,643,264 B2 | 5/2017 | Frota De Souza et al. | |

(Continued)

FOREIGN PATENT DOCUMENTS

DE 102005012025 12/2006

OTHER PUBLICATIONS

International Search Report dated Oct. 14, 2021, issued in PCT counterpart application (No. PCT/IL2021/050699).

(Continued)

*Primary Examiner* — Nicole N Ramos
(74) *Attorney, Agent, or Firm* — Womble Bond Dickinson (US) LLP

(57) ABSTRACT

A replaceable milling head rotatable in a cutting direction about a longitudinal central axis, the central axis defining a forward direction and an opposite rearward direction, has a forward cutting portion and a rear threaded coupling portion for coupling to a shank. The cutting portion includes two or more key actuating portions which assist in mounting the milling head onto the shank. The cutting portion includes a plurality of helical chip flutes alternating with cutting edges. At least one or more of the cutting edges and flutes extend axially rearward of at least a portion of the key actuating portions.

19 Claims, 4 Drawing Sheets

(56) References Cited

U.S. PATENT DOCUMENTS

| | | | |
|---|---|---|---|
| 9,925,602 B2 | 3/2018 | Azegami et al. | |
| 10,105,771 B2 | 10/2018 | Guy | |
| 2006/0051174 A1* | 3/2006 | Pantzar | B23C 5/10 409/234 |
| 2006/0257215 A1 | 11/2006 | Kakai | |
| 2007/0248421 A1 | 10/2007 | Kakai et al. | |
| 2008/0304923 A1* | 12/2008 | Lehto | B23B 31/1115 407/100 |
| 2009/0010709 A1 | 1/2009 | Berglow et al. | |
| 2009/0142150 A1* | 6/2009 | Chu | B23C 5/10 408/59 |
| 2010/0247263 A1* | 9/2010 | Azegami | B23C 5/10 409/234 |
| 2012/0009027 A1 | 1/2012 | Sharivker et al. | |
| 2013/0272806 A1* | 10/2013 | Guay | B23C 5/109 29/527.1 |
| 2014/0294528 A1* | 10/2014 | Azegami | B23C 5/10 408/200 |
| 2015/0016905 A1 | 1/2015 | Haimer | |
| 2015/0030399 A1 | 1/2015 | Frota De Souza et al. | |
| 2015/0063928 A1 | 3/2015 | Maeda et al. | |
| 2015/0314379 A1 | 11/2015 | Sharivker et al. | |
| 2016/0031018 A1* | 2/2016 | Ota | B23C 5/10 407/53 |
| 2017/0266738 A1 | 9/2017 | Guy | |
| 2017/0291230 A1 | 10/2017 | Harpaz et al. | |

OTHER PUBLICATIONS

Written Opinion dated Oct. 14, 2021, issued in PCT counterpart application (No. PCT/IL2021/050699).

Sandvik Coromant Catalog, "The exchangeable-head milling system," CoroMill® 316, retrieved Dec. 9, 2019, pp. 2-10, found at https://www.sandvik.coromant.com/en-us/products/coromill_316/pages/product-details.aspx.

Sandvik Coromant Catalog, "Rotating tools," CoroMill® 316, 2012, pp. D211-D224.

* cited by examiner

ROTARY CUTTING HEAD HAVING CUTTING EDGES EXTENDING PAST KEY ACTUATING PORTION

FIELD OF THE INVENTION

The present invention relates to a replaceable milling head having fixed key actuating portions, for use in metal cutting processes in general, and for milling operations in particular.

BACKGROUND OF THE INVENTION

In rotary cutting tools, specifically replaceable milling heads, some tools are known to have latching surfaces on the replaceable milling head. Some latching surfaces are known to be located in fixed positions on a latching portion.

U.S. Pat. No. 9,925,602 discloses a replaceable cutting head provided with a cutting blade portion, a latching portion and an attaching portion. An outer periphery of the head body is provided with a plurality of first chip discharge grooves and second chip discharge grooves, both extending along an axis, the second chip discharge grooves having a narrower width along the circumferential direction. Cutting blades extend along the first and second chip discharge grooves. A pair of latching faces are formed by cutting the outer periphery of the latching portion in a planar shape, and are arranged on a base end side of the chip discharge grooves and cutting blades, wherein at least one of the pair of latching face connects to a base end portion of the second chip discharge grooves. The latching faces are cut out by chip discharge grooves, with the purpose of allowing enhanced chip discharge performance, allowing a shorter length of the cutting head and preventing chattering vibrations.

It is an object of the subject matter of the present application to increase the cutting length of the cutting head, thereby allowing the same cutting length for a shorter length of the cutting head, lowering material use and reducing the chattering vibrations.

SUMMARY OF THE INVENTION

In accordance with the present invention, there is provided a replaceable milling head rotatable in a cutting direction about a longitudinal central axis defining a forward direction and an opposite rearward direction, the milling head comprising: a cutting portion comprising: an abutment surface, facing in the rearward direction and extending annularly about the central axis; a peripheral surface extending forward from the abutment surface; a plurality of chip removal flutes extending along the peripheral surface; a plurality of cutting edges, each extending along a respective chip removal flute; and a first and second key actuating portions formed on radially opposite sides of the peripheral surface; each of the first and second key actuating portions comprising: a rearward-facing top shoulder; a forward-facing bottom shoulder located rearward of the top shoulder; and a bracing surface extending between the top shoulder to the bottom shoulder; the milling head further comprising a threaded coupling portion, extending rearward of the abutment surface; wherein: at least one cutting edge has an active rear cutting edge portion located axially rearward of at least one of the top shoulders.

Also in accordance with the present invention, each bracing surface may be split into a leading surface and a trailing surface which straddle a portion of one of the chip removal flutes.

Also in accordance with the present invention, an actuating portion axial length extends parallel to the central axis from one of the top shoulders to a respective bottom shoulder, an additional cutting extent extends parallel to the central axis from one of the top shoulders to an axially rearmost point of the respective rear cutting edge portion, wherein the relation between the additional cutting extent and the actuating portion axial length may fulfil the condition:

$$\frac{CL}{SL} \geq 0.3.$$

Also in accordance with the present invention, a rear core diameter, located rearward of at least one of the top shoulders and measurable as the diameter of an inscribed circle of the milling head from a forward view, may be equal to, or larger than, a forward core diameter, located forward of the top shoulders and measurable as the diameter of the inscribed circle of the milling head from a rear view.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
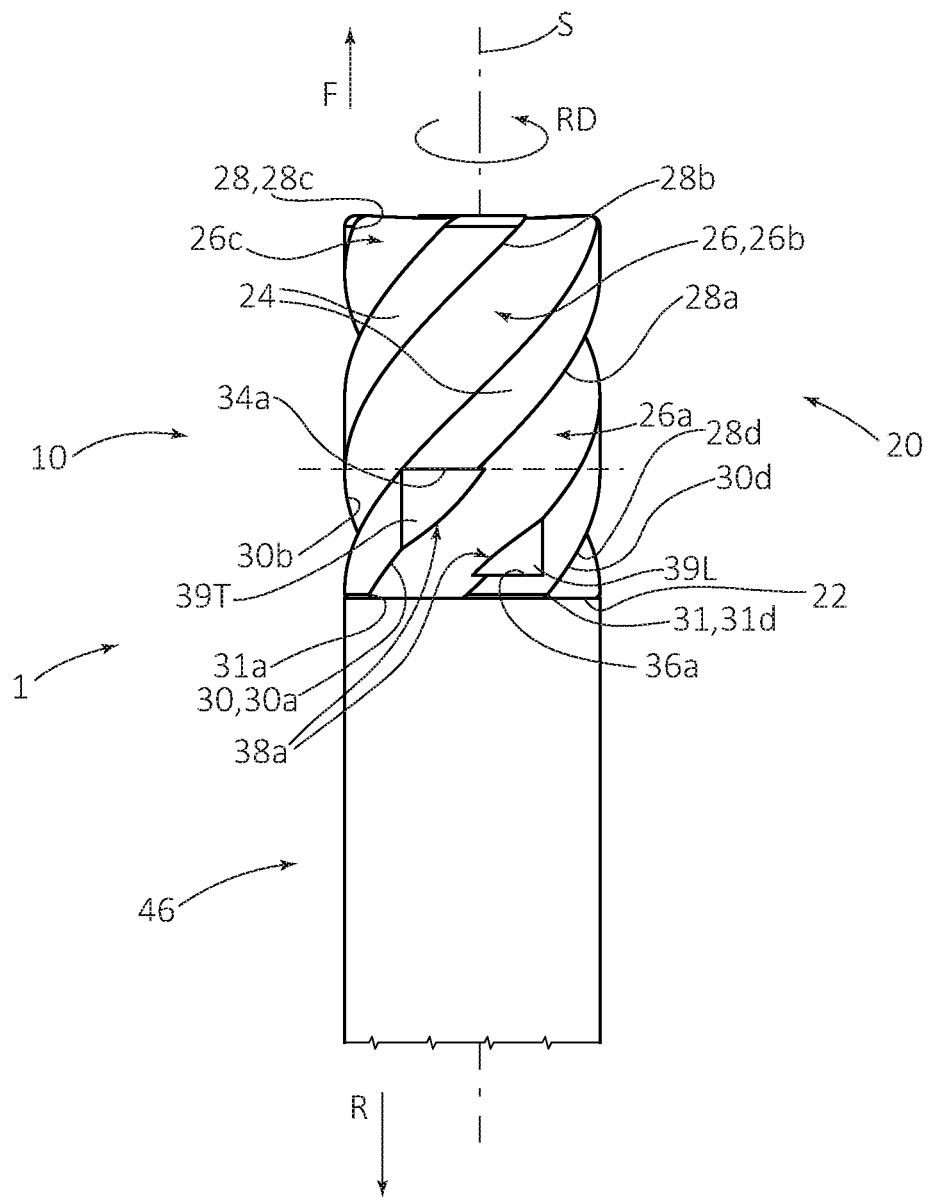
FIG. 1 is a side view of a cutting tool in accordance with the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Referring to FIG. 1, a schematic drawing of a cutting tool 1 according to the present invention is shown from a side view. The cutting tool 1 includes a tool shank 46 and a replaceable milling head 10, rotatable in a cutting direction RD about a longitudinal central axis S. The central axis S defines a forward direction F and an opposite rearward direction R. The milling head 10 includes a cutting portion 20 extending forward from a rearward facing annularly extending abutment surface 22, with the shank 46 extending rearwards of the abutment surface 22.

In some embodiments the replaceable milling head 10 is used for shoulder milling operations.

Figure 2:
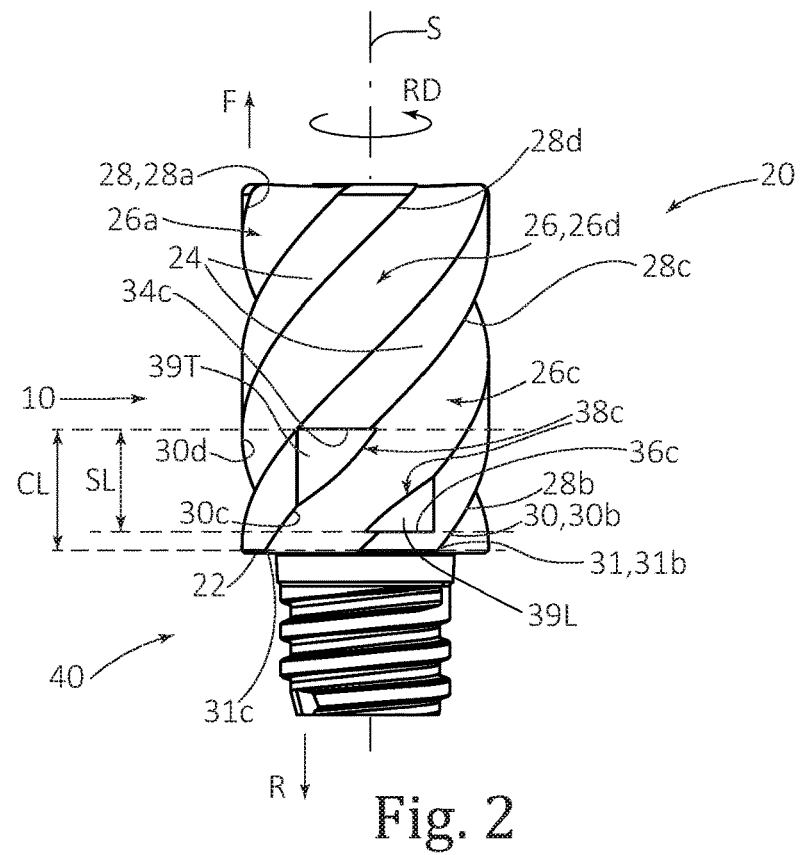
FIG. 2 is a first side view of the milling head of the cutting tool of FIG. 1.

Referring to FIG. 2, a first side view of the milling head 10 shows the milling head 10 further includes a threaded coupling portion 40. The threaded coupling portion 40 extends rearward of the abutment surface 22, and removably attaches the milling head 10 to the shank 46.

The cutting portion 20 of the milling head 10 includes the abutment surface 22 and a peripheral surface 24 extending forward from the abutment surface 22. The cutting portion 20 also includes a plurality of chip removal flutes 26 extending helically along the peripheral surface 24. A cutting edge 28 extends along each chip removal flute 26.

In the embodiment described herein, the milling head 10 has four chip removal flutes 26, namely a first chip removal flute 26a, a second chip removal flute 26b, a third chip removal flute 26c and a fourth chip removal flute 26d. Correspondingly, the milling head 10 has four cutting edges 28, specifically a first cutting edge 28a, a second cutting edge 28b, a third cutting edge 28c and a fourth cutting edge 28d.

In some embodiments, the chip removal flutes 26 may extend non-helically along the peripheral surface 24.

Figure 3:
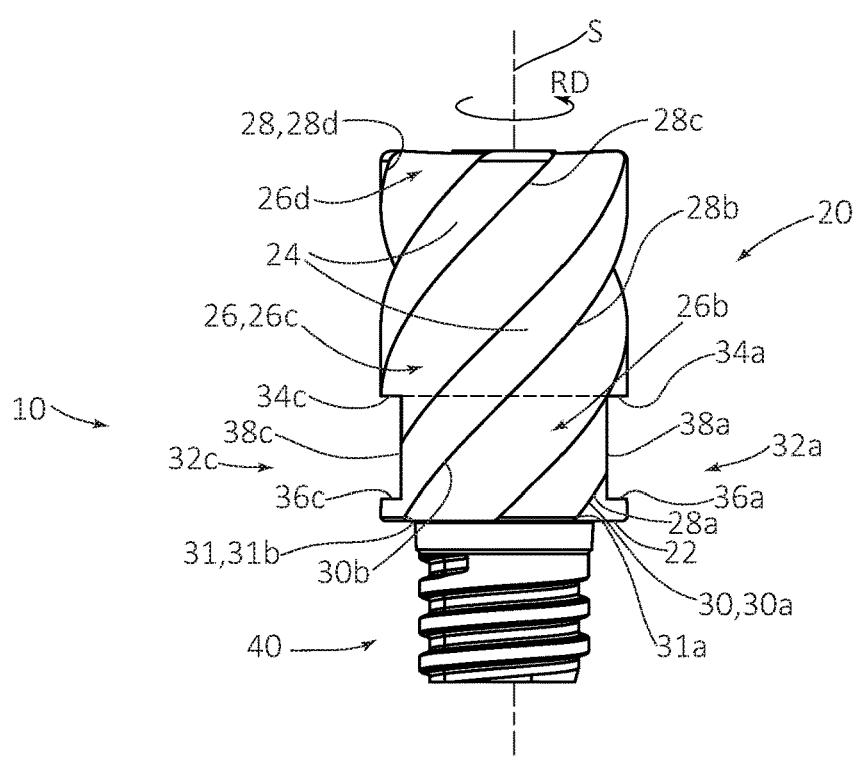
FIG. 3 is a second side view of the milling head of the cutting tool of FIG. 1.
Figure 6:
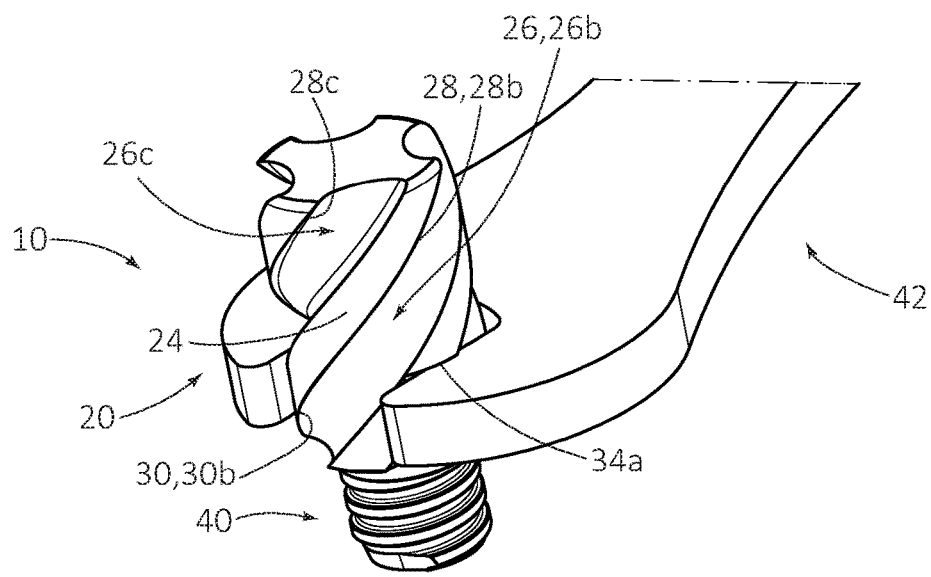
FIG. 6 is a view of the milling head of FIG. 2 in engagement with a key.
Figure 7:
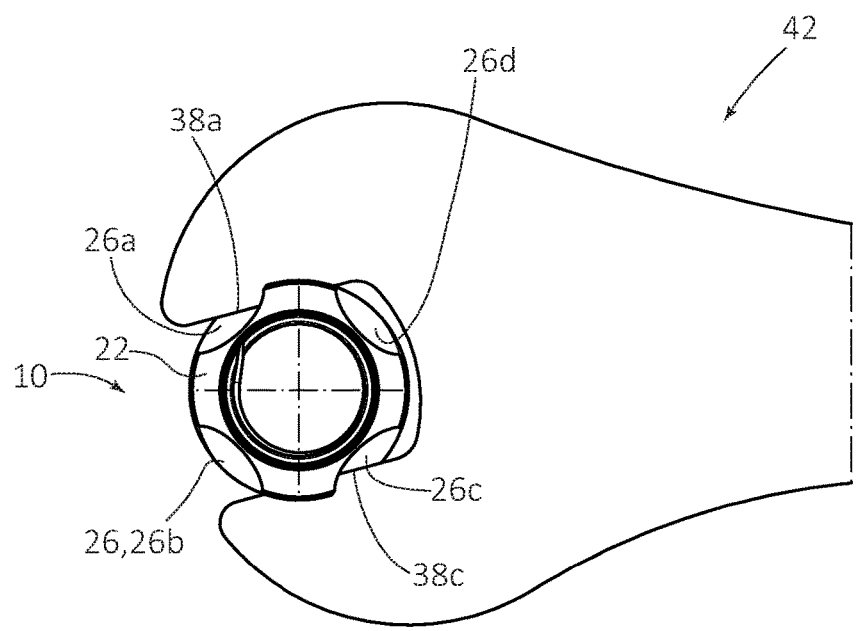
FIG. 7 is a rear view of the milling head of FIG. 2 in engagement with a key.

Referring to FIG. 3, FIG. 6 and FIG. 7, the cutting portion 20 further includes a first key actuating portion 32a and a second key actuating portion 32c. The first and second key actuating portions 32a, 32c are formed on radially opposite sides of the peripheral surface 24, and interrupt the first and third cutting edges 28a, 28c respectively. A key 42 engages the first and second key actuating portions 32a, 32c for the attachment and removal of the milling head 10 from the shank 46.

In some embodiments, the key actuating portions 32a, 32c are adjacent to, spaced apart from, and located forward of, the abutment surface 22.

Each of the first and second key actuating portions 32a, 32c has a rearward facing top shoulder 34a, 34c, a forward facing bottom shoulder 36a, 36c located rearward of the top shoulder 34a, 34c and a bracing surface 38a, 38c extending between the top shoulder 34a, 34c and the bottom shoulder 36a, 36c.

At least one of the cutting edges 28 has an active rear cutting edge portion 30, which is located rearward of the top shoulders 34a, 34c. Having a milling head 10 with at least one active cutting edge portion 30 allows a longer cutting edge 28 for a similar milling head 10, or allows the usage of a smaller milling head 10. In the embodiment described herein, the milling head 10 has four rear cutting edge portions 30, specifically a first rear cutting edge portion 30a, a second cutting edge portion 30b, a third rear cutting edge portion 30c and a fourth rear cutting edge portion 30d.

As seen in FIG. 2, an actuating portion axial length SL extends parallel to the central axis S from one of the top shoulders 34a, 34c to a respective bottom shoulder 36a, 36c. In some embodiments, some of, or all of the top shoulders 34a, 34c and bottom shoulders 36a, 36c may have an axial extent (not shown).

In embodiments where at least one of top shoulders 34a, 34c has an axial extent, the actuating portion axial length SL extends from the rearmost end of one of the top shoulders 34a, 34c to a respective rear shoulder 36a, 36c.

In embodiments where at least one of bottom shoulders 36a, 36c has an axial extent, the actuating portion axial length SL extends from one of the top shoulders 34a, 34c to a forwardmost end of a respective bottom shoulder 36a, 36c.

Having an axial extent allows the key 42 easy access to the key actuating portions 32a, 32c. Having an axial extent may also strengthen the cutting edges 28 adjacent to the top shoulders 34a, 34c and the cutting edges 28 adjacent to the bottom shoulders 36a, 36c.

At least one active rear cutting edge portion 30 may extend to at least 50% of the actuating portion axial length SL in the rearward direction R. At least one active rear cutting edge portion 30 may extend axially rearward of the bracing surfaces 38a, 38c. At least one active rear cutting edge portion 30 may extend axially rearward of the bottom shoulders 36a, 36c. At least one active rear cutting edge portion 30 may extend to the abutment surface 22.

The top shoulders 34a, 34c and the bottom shoulders 36a, 36c of the key actuating portions 32a, 32c limit the movement of the key 42 along the central axis S. When the milling head 10 is attached to, or removed from the shank 46, the bracing surfaces 38a, 38c abut the key 42 directly, allowing the rotational attachment and removal of the milling head 10 to/from the shank 46.

Referring back to FIG. 2, the first and third chip removal flutes 26a, 26c intersect the top shoulders 34a, 34c, the bottom shoulders 36a, 36c and the bracing surfaces 38a, 38c. The intersected bracing surfaces 38a, 38c are each split into a leading surface 39L and a trailing surface 39T. The leading surface 39L is located at an end of the key actuating portions 32a, 32c in the cutting direction RD. The trailing surfaces 39T is located at an end of the key actuating portions 32a, 32c opposite the cutting direction RD. As seen in FIG. 1 the leading and trailing surfaces 39L, 39T straddle a portion of the first chip removal flute 26a between the top shoulder 34a and the bottom shoulder 36a.

In some embodiments at least one chip removal flute 26 may intersect at least one of the top shoulders 34a, 34c and their respective bracing surface 38a, 38c, leaving the bottom shoulders 36a, 36c whole. In some embodiments at least one chip removal flute 26 may extend to at least 50% of the actuating portion axial length SL in the rearward direction R. At least one of the chip removal flutes 26a, 26c may further intersect at least one of the bottom shoulders 36a, 36c. In some embodiments, all four chip removal flutes 26 may intersect the abutment surface 22.

In some embodiments, the key actuating portions 32a, 32c may be confined between two adjacent chip removal flutes 26, leaving the bracing surfaces 38a, 38c whole.

The milling head 10 may have four chip removal flutes 26 and four cutting edges 28. Having fewer cutting edges 28 allows at most one rear cutting edge portion 30 to be located rearward of the top shoulders 34a, 34c and forward of the bottom shoulders 36a, 36c. In such a case the wear of the single rear cutting edge portion 30 would be greater compared to a milling head 10 having more cutting edges 28. In the latter case, at least two rear cutting edge portions 30 are located rearward of the top shoulders 34a, 34c and forward of the bottom shoulders 36a, 36c.

Having more than four chip removal flutes 26 decreases the surface area of the trailing surfaces 39T and the leading surfaces 39L. When the key 42 is used to attach the milling head 10 to the shank 46 it abuts the trailing surfaces 39T. When the key 42 is used to detach the milling head 10 from the shank 46 it abuts the leading surfaces 39L. Decreasing the surface area of the leading surfaces 39L leads to a greater strain on the leading surfaces 39L when removing the milling head 10 from the shank 46. Likewise, decreasing the surface area of the trailing surfaces 39T leads to a greater strain on the trailing surfaces 39T when attaching the milling head to the shank 46. A greater strain may lead to fissures on the milling head 10, and even breakage, when attaching and removing the milling head 10 from the shank 46.

In some embodiments the trailing surface 39T may have a greater surface area than its respective leading surface 39L, allowing a better rotational attachment between the milling head 10 and the shank 46. Alternatively, the leading surface 39L and the trailing surface 39T may be similarly sized.

An additional cutting extent CL extends parallel to the central axis S from one of the top shoulders 34a, 34c to an axially rearmost point 31 of one of the rear cutting edge portions 30.

In some embodiments, at least one of the top shoulders 34a, 34c may have an axial extent. In this case the additional cutting length CL extends from a forwardmost end of one of the top shoulders to the axially rearmost point 31. In the embodiment shown herein, there are four axially rearmost points 31, specifically a first axially rearmost point 31a, a second axially rearmost point 31b, a third axially rearmost point 31c and a fourth axially rearmost point 31d.

In some embodiments, the additional cutting extent CL and the actuating portion axial length SL fulfil the condition:

$$\frac{CL}{SL} \geq 0.3.$$

The additional cutting extent CL and the actuating portion axial length SL may further fulfil the condition:

$$2 \geq \frac{CL}{SL} \geq 0.5.$$

Figure 4:
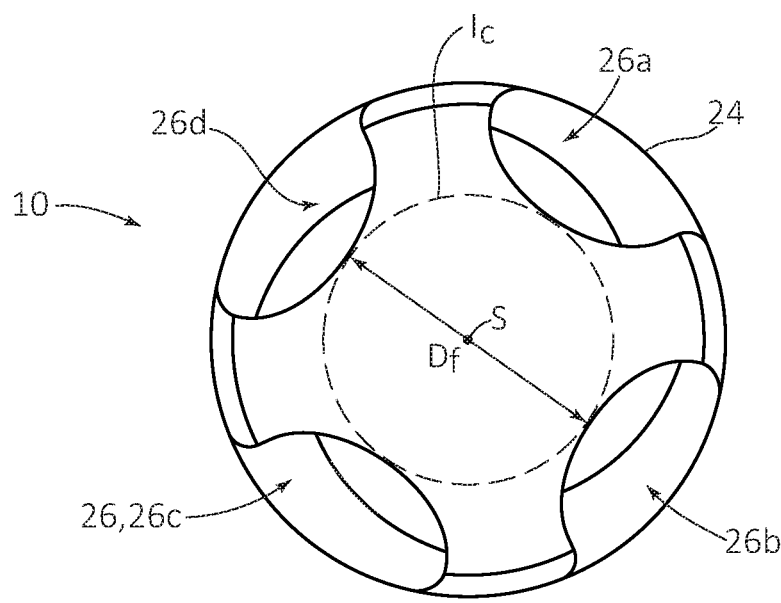
FIG. 4 is a forward view of the milling head of FIG. 2.

Referring to FIG. 4, a forward core diameter $D_f$ extends forward of the top shoulders 34a, 34c, perpendicular to the central axis S and measurable as the diameter of a core inscribed circle $I_c$ of the milling head 10 from a forward view.

Figure 5:
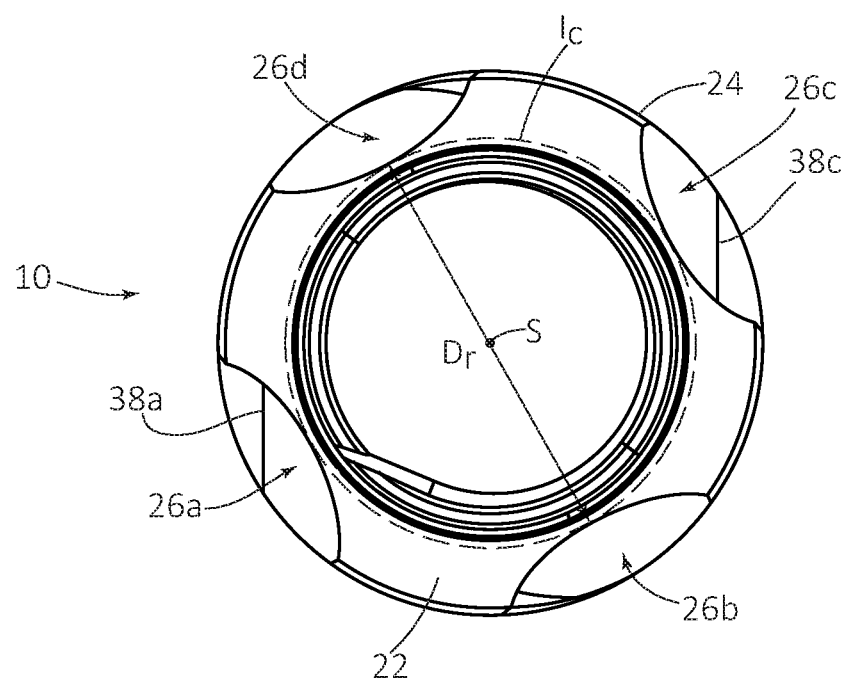
FIG. 5 is a rear view of the milling head of FIG. 2.

Referring to FIG. 5, a rear core diameter $D_r$ extends rearward of at least one of the top shoulders 34a, 34c, perpendicular to the central axis S and measurable as the diameter of the core inscribed circle $I_c$ of the milling head 10 from a rear view.

In some embodiments, the rear core diameter $D_r$ is equal to, or greater than, the forward core diameter $D_f$. Advantageously, the rear core diameter $D_r$ may be between 1.05 and 1.15 times the forward core diameter $D_f$, i.e. $D_f*1.05 \leq D_r \leq D_f*1.15$.

In the present invention, the purpose of the chip removal flutes 26 extending rearwards of the top shoulders 34a, 34c is to extend the active cutting edges 28 rearward of the top shoulders 34a, 34c. To allow the proper formation of chips while machining, a minimal flute depth is needed, meaning that to allow active cutting edges 28 a minimal flute depth must be maintained, as indicated by the rear core diameter $D_r$ and the forward core diameter $D_f$.

Although the subject matter of the present application has been described with a certain degree of particularity, it should be understood that various alterations and modifications could be made without departing from the spirit or scope of the invention as hereinafter claimed.

What is claimed is:

1. A replaceable milling head (10) rotatable in a cutting direction (RD) about a longitudinal central axis (S) defining a forward direction (F) and an opposite rearward direction (R), the milling head (10) comprising:
    a cutting portion (20), comprising:
        an abutment surface (22), facing in the rearward direction (R) and extending annularly about the central axis (S);
        a peripheral surface (24) extending forward (F) from the abutment surface (22);
        a plurality of chip removal flutes (26) extending along the peripheral surface (24);
        a plurality of cutting edges (28), each extending along a respective chip removal flute (26); and
        a first and second key actuating portions (32a, 32c) formed on radially opposite sides of the peripheral surface (24), each of the first and second key actuating portions (32a, 32c) comprising:
            a rearward-facing top shoulder (34a, 34c);
            a forward-facing bottom shoulder (36a, 36c) located rearward of the top shoulder (34a, 34c); and
            a bracing surface (38a, 38c) extending between the top shoulder (34a, 34c) to the bottom shoulder (36a, 36c); and
    a threaded coupling portion (40), extending rearward (R) of the abutment surface (22);
    wherein:
        at least one cutting edge (28) has an active rear cutting edge portion (30) located axially rearward of at least one of the top shoulders (34a, 34c); and
        at least one of the chip removal flutes (26) intersects at least one of the bottom shoulders (36a, 36c).

2. The replaceable milling head (10) according to claim 1, wherein at least one of the chip removal flutes (26) intersects at least one of the top shoulders (34a, 34c).

3. The replaceable milling head (10) according to claim 1, wherein at least one of the chip removal flutes (26) intersects at least one of the bracing surfaces (38a, 38c).

4. The replaceable milling head (10) according to claim 1, wherein the at least one active rear cutting edge portion (30) intersects the abutment surface (22).

5. The replaceable milling head (10) according to claim 1, wherein the at least one active rear cutting edge portion (30) extends axially rearward of at least one of the bottom shoulders (36a, 36c).

6. The replaceable milling head (10) according to claim 1, wherein
    an actuating portion axial length (SL) extends parallel to the central axis S from one of the top shoulders (34a, 34c) to a respective bottom shoulder (36a, 36c), and
    at least one active rear cutting edge portion (30) extends to at least 50% of the actuating portion axial length (SL) in the rearward direction (R).

7. The replaceable milling head (10) according to claim 1, wherein the number of chip removal flutes (26) is four, and the number of cutting edges (28) is four.

8. The replaceable milling head (10) according to claim 7, wherein exactly two of the chip removal flutes (26a, 26c) intersect the top shoulders (34a, 34c), the bottom shoulders (36a, 36c) and the bracing surfaces (38a, 38c).

9. The replaceable milling head (10) according to claim 7, wherein all four chip removal flutes (26) intersect the abutment surface (22).

10. The replaceable milling head (10) according to claim 1, wherein each bracing surface (38a, 38c) is split into a leading surface (39L) and a trailing surface (39T) which straddle a portion of one of the chip removal flutes (26).

11. The replaceable milling head (10) according to claim 1, wherein
an additional cutting extent (CL) extends parallel to the central axis (S) from one of the top shoulders (34a, 34c) to an axially rearmost point (31) of the respective rear cutting edge portion (30),
an actuating portion axial length (SL) extends parallel to the central axis (S) from one of the top shoulders (34a, 34c) to a respective bottom shoulders (36a, 36c), and
the relation between the additional cutting extent (CL) and the actuating portion axial length (SL) fulfils the condition:

$$\frac{CL}{SL} \geq 0.3.$$

12. The replaceable milling head (10) according to claim 11, wherein the relation between the additional cutting extent (CL) and the actuating portion axial length (SL) fulfils the condition:

$$2 \geq \frac{CL}{SL} \geq 0.5.$$

13. The replaceable milling head (10) according to claim 1, wherein
a rear core diameter (Dr) is located rearward of at least one of the top shoulders (34a, 34c) and measurable as the diameter of an inscribed circle (Ic) of the milling head (10) from a forward view, and
a forward core diameter (Df) is located forward of the top shoulders (34a, 34c) and measurable as the diameter of the inscribed circle (Ic) of the milling head (10) from a rear view, and wherein
the rear core diameter (Dr) is equal to, or larger than, the forward core diameter (Df).

14. The replaceable milling head (10) according to claim 13, wherein the rear core diameter (Dr) is between 5% and 15% larger than the forward core diameter (Df).

15. The replaceable milling head (10) according to claim 1, wherein the chip removal flutes (26) extend helically along the peripheral surface (24).

16. A replaceable milling head (10) rotatable in a cutting direction (RD) about a longitudinal central axis (S) defining a forward direction (F) and an opposite rearward direction (R), the milling head (10) comprising:
a cutting portion (20), comprising:
an abutment surface (22), facing in the rearward direction (R) and extending annularly about the central axis (S);
a peripheral surface (24) extending forward (F) from the abutment surface (22);
a plurality of chip removal flutes (26) extending along the peripheral surface (24);
a plurality of cutting edges (28), each extending along a respective chip removal flute (26); and
a first and second key actuating portions (32a, 32c) formed on radially opposite sides of the peripheral surface (24), each of the first and second key actuating portions (32a, 32c) comprising:
a rearward-facing top shoulder (34a, 34c);
a forward-facing bottom shoulder (36a, 36c) located rearward of the top shoulder (34a, 34c); and
a bracing surface (38a, 38c) extending between the top shoulder (34a, 34c) to the bottom shoulder (36a, 36c); and
a threaded coupling portion (40), extending rearward (R) of the abutment surface (22);
wherein:
at least one cutting edge (28) has an active rear cutting edge portion (30) located axially rearward of at least one of the top shoulders (34a, 34c); and
the at least one active rear cutting edge portion (30) extends axially rearward of at least one of the bottom shoulders (36a, 36c).

17. The replaceable milling head (10) according to claim 16, wherein
an actuating portion axial length (SL) extends parallel to the central axis S from one of the top shoulders (34a, 34c) to a respective bottom shoulder (36a, 36c), and
at least one of the chip removal flutes (26) extends to at least 50% of the actuating portion axial length (SL) in the rearward direction (R).

18. The replaceable milling head (10) according to claim 16, wherein the at least one active rear cutting edge portion (30) intersects the abutment surface (22).

19. A replaceable milling head (10) rotatable in a cutting direction (RD) about a longitudinal central axis (S) defining a forward direction (F) and an opposite rearward direction (R), the milling head (10) comprising:
a cutting portion (20), comprising:
an abutment surface (22), facing in the rearward direction (R) and extending annularly about the central axis (S);
a peripheral surface (24) extending forward (F) from the abutment surface (22);
a plurality of chip removal flutes (26) extending along the peripheral surface (24);
a plurality of cutting edges (28), each extending along a respective chip removal flute (26); and
a first and second key actuating portions (32a, 32c) formed on radially opposite sides of the peripheral surface (24), each of the first and second key actuating portions (32a, 32c) comprising:
a rearward-facing top shoulder (34a, 34c);
a forward-facing bottom shoulder (36a, 36c) located rearward of the top shoulder (34a, 34c); and
a bracing surface (38a, 38c) extending between the top shoulder (34a, 34c) to the bottom shoulder (36a, 36c); and
a threaded coupling portion (40), extending rearward (R) of the abutment surface (22);
wherein:
at least one cutting edge (28) has an active rear cutting edge portion (30) located axially rearward of at least one of the top shoulders (34a, 34c);
the number of chip removal flutes (26) is four, and the number of cutting edges (28) is four; and
all four chip removal flutes (26) intersect the abutment surface (22).

* * * * *